US010059010B2

(12) United States Patent
Bakir (10) Patent No.: US 10,059,010 B2
(45) Date of Patent: Aug. 28, 2018

(54) MANIPULATOR ARM MODULE (71) Applicants: Ahmad Kamal Bakir, Saskatoon (CA); Najib Jomha, Saskatoon (CA)

(72) Inventor: Ahmad Kamal Bakir, Saskatoon (CA)

(*) Notice: Subject to any disclaimer, the term of this patent is extended or adjusted under 35 U.S.C. 154(b) by 416 days.

(21) Appl. No.: 14/770,722

(22) PCT Filed: Feb. 21, 2014

(86) PCT No.: PCT/CA2014/000141
§ 371 (c)(1),
(2) Date: Aug. 26, 2015

(87) PCT Pub. No.: WO2014/131109
PCT Pub. Date: Sep. 4, 2014

(65) Prior Publication Data
US 2016/0008989 A1 Jan. 14, 2016

(30) Foreign Application Priority Data
Feb. 26, 2013 (CA) .................................... 2807287

(51) Int. Cl.
*B25J 17/00* (2006.01)
*B25J 9/06* (2006.01)
(Continued)

(52) U.S. Cl.
CPC ................. *B25J 17/00* (2013.01); *B25J 9/06* (2013.01); *B25J 9/08* (2013.01); *B25J 9/102* (2013.01);
(Continued)

(58) Field of Classification Search
CPC ......... B25J 9/06; B25J 9/08; B25J 9/12; B25J 9/14; B25J 9/102; B25J 17/00; B25J 17/02; B25J 17/025; B25J 17/0291; B25J 18/00
(Continued)

(56) References Cited

U.S. PATENT DOCUMENTS 4,690,012 A 9/1987 Dahlquist
4,990,050 A 2/1991 Tsuge
(Continued)

FOREIGN PATENT DOCUMENTS

CA 2773839 9/2013
CA 2807287 8/2014
(Continued)

OTHER PUBLICATIONS

International Search Report, 4 pages, dated May 15, 2014.

*Primary Examiner* — William C Joyce
(74) *Attorney, Agent, or Firm* — Michael A. Bondi; Moss & Barnett (57) ABSTRACT

A manipulator arm module includes a hollow spool with corresponding top and bottom spool ends. An upper envelope member has a bottom ring rotatably attached to the top spool end, a top ring oriented at an angle to the bottom ring, and struts rigidly connecting the rings. A top drive rotates the bottom ring with respect to the spool. A manipulator arm comprises a plurality of modules the bottom spool end of one module rotatably attached to the top ring of a next lower adjacent module. Each ring is rotationally driven independently. A stabilizer is connected between adjacent spools and allows the adjacent spools to move closer together or farther apart, and resists relative rotative movement of the adjacent spools.

10 Claims, 6 Drawing Sheets

(51) Int. Cl.
    *B25J 9/10*         (2006.01)
    *B25J 17/02*       (2006.01)
    *B25J 9/12*         (2006.01)
    *B25J 9/14*         (2006.01)
    *B25J 18/00*       (2006.01)
    *B25J 9/08*         (2006.01)

(52) U.S. Cl.
    CPC . *B25J 9/12* (2013.01); *B25J 9/14* (2013.01); *B25J 17/02* (2013.01); *B25J 17/025* (2013.01); *B25J 17/0291* (2013.01); *B25J 18/00* (2013.01)

(58) Field of Classification Search
    USPC .......................................... 74/490.01, 490.03
    See application file for complete search history.

(56) References Cited

U.S. PATENT DOCUMENTS

| | | | |
|---|---|---|---|
| 5,860,327 A * | 1/1999 | Stanev | B25J 9/02 |
| | | | 248/371 |
| 6,871,563 B2 | 3/2005 | Choset | |
| 7,597,025 B2 * | 10/2009 | Narita | B25J 9/06 |
| | | | 74/490.02 |
| 2004/0149064 A1 | 8/2004 | Narita | |
| 2006/0179964 A1 | 8/2006 | Hama | |

FOREIGN PATENT DOCUMENTS

| | | |
|---|---|---|
| JP | H10225881 | 8/1998 |
| WO | WO2013080197 | 6/2013 |
| WO | WO2014131109 | 9/2014 |

* cited by examiner

MANIPULATOR ARM MODULE

FIELD OF THE INVENTION

This invention is in the field of manipulator arms and in particular a modular manipulator arm.

BACKGROUND OF THE INVENTION

Robotics form an indispensable component of modern manufacturing industries, the medical profession, and many other industries. For example, robotic arms are commonly employed to perform that may be too difficult, dangerous or require more precision or force than a human worker can provide.

Robotic arms come in a wide variety of forms depending on the needs of the intended as articulated robotic arms which are composed of a plurality rotary joints. In some instances, robotic arms are composed of a series of rotating modules linked together such that the robotic arm can be manipulated in a manner that allows access to tight and twisting spaces.

Such arms are commonly made up of a plurality of modules shaped generally as an elongated member having non-parallel faces at each end, each face rotatably attached to a face of an adjacent module. A tool, camera, or the like is often attached to one end of the arm, and when the modules are rotated relative to each other, the tool can be manipulated in a variety of directions. Such modular arms are described for example in U.S. Pat. No. 7,836,788 to Kamon et al., U.S. Pat. No. 4,904,148 to Larsson, and U.S. Pat. No. 7,597,025 to Narita et al.

SUMMARY OF THE INVENTION

It is an object of the present invention to provide a modular manipulator arm apparatus that overcomes problems in the prior art.

The present invention provides a manipulator arm module comprising a hollow spool member having top and bottom spool ends oriented in corresponding top and bottom spool end planes; an upper envelope member comprising a bottom ring rotatably attached to the top spool end, a top ring oriented at an angle to the bottom ring, and a plurality of struts connecting the top and bottom rings in a substantially rigid relationship; and a top drive operative to selectively rotate the bottom ring of the upper envelope member with respect to the top spool end.

A manipulator arm apparatus comprises a plurality of manipulator arm modules wherein the bottom spool end of each intermediate module is rotatably attached to the top ring of a next lower adjacent module, and a top ring of each intermediate module is rotatably attached to the bottom spool end of a next higher adjacent module. A bottom drive is operative to selectively rotate the top ring of each intermediate module with respect to the bottom spool end of the next adjacent module, and at least one stabilizer is connected between adjacent hollow spool members and is operative to allow the adjacent hollow spool members to move closer together or farther apart, and also is operative to resist relative rotative movement of the adjacent hollow spool members.

Various tools can be mounted to one end of the manipulator arm. Each top and bottom drive is operated independently to provide for a wide range of movement for the tool. The invention can be scaled up or down to suit a wide variety of applications.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

FIGS. 1-4 schematically illustrate an embodiment of a manipulator arm module 1 of the present invention. The module 1 comprises a hollow spool member 3 having top and bottom spool ends 3A, 3B oriented in corresponding top and bottom spool end planes. The spool end planes in the illustrated module 1 are parallel however could of course be oriented at a non-parallel angle. The length L of the spool member 3 can be very short where the application requires same, and thus provide increased articulation in a given length of manipulator arm.

Figure 1:
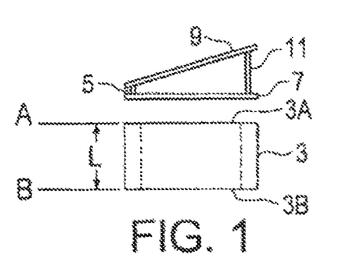
FIG. 1 is a schematic exploded side view of the spool member and envelope member of an embodiment of a manipulator arm module of the present invention.
Figure 2:
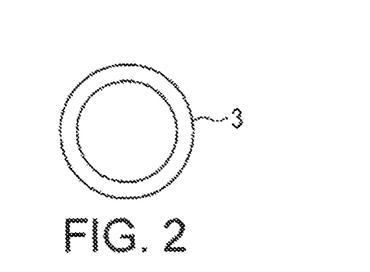
FIG. 2 is a schematic bottom view of the spool member of FIG. 1.

An upper envelope member 5 comprises a bottom ring 7 rotatably attached to the top spool end 3A, a top ring 9 oriented at an angle to the bottom ring 7, and a plurality of struts 11 connecting the top and bottom rings 7, 9 in a rigid relationship, it is contemplated that a bent pipe or the like could similarly provide the envelope member, which is essentially two rings connected together such that the planes of the rings are at an angle to each other as shown.

It is to be noted that the terms "upper", "lower", "top", "bottom", and the like are used for reference purposes to clearly describe the relationship of the parts only and are not to be taken to dictate the orientation of the module 1 as a whole when in use.

Figure 5A:
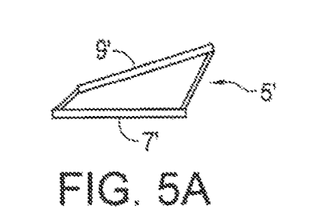
FIG. 5A is a schematic side view of an alternate envelope member with offset top and bottom rings.
Figure 5B:
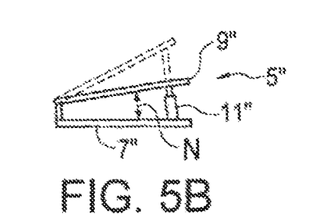
FIG. 5B is a schematic side view of an alternate envelope member where the angle between the top and bottom rings is adjustable.

FIG. 5A schematically illustrates an alternate envelope member 5' where the top ring 9' is offset somewhat with respect to the bottom ring 7'. FIG. 5B schematically illustrates a further alternate envelope member 5" where the angle N between the top ring 9" and the bottom ring 7" can be changed by extending or retracting the struts 11", such as by using a hydraulic cylinder to provide the struts 11", and running the hydraulic conduits through the hollow interior of the spool members. Other configurations are possible to suit a particular application as required.

The top and bottom spool ends 3A, 3B and the top and bottom rings 9, 7 are illustrated as being the same diameter but it is contemplated as well that if required the diameter of one ring or spool end could be different from the other.

Figure 3:
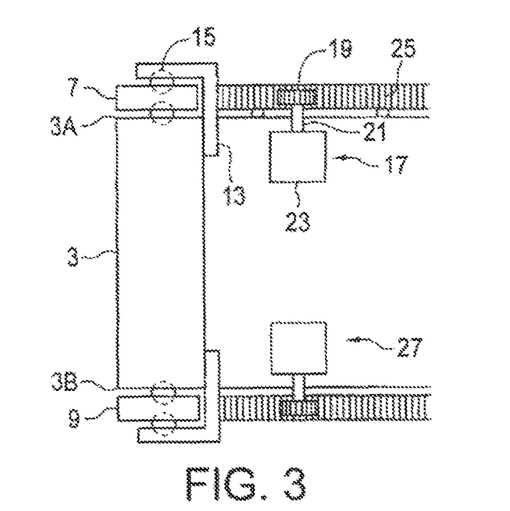
FIG. 3 is a schematic cut-away side view of the rotatable connection of the bottom ring to the spool member, and of the ring drives of the embodiment of FIG. 1.
Figure 4:
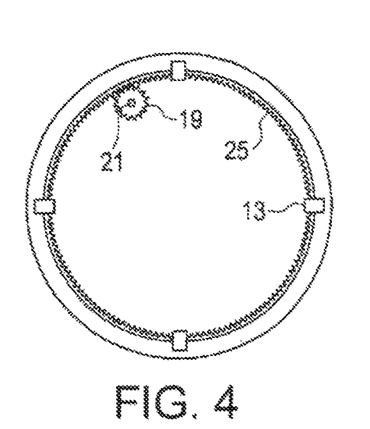
FIG. 4 is a schematic top view of the rotatable connection of the bottom ring to the spool member, and of the top ring drive shown in FIG. 3.

In the illustrated module 1, the bottom ring 7 is rotatably attached to the top spool end 3A by a series of brackets 13 fixed to the spool 3 that hold the ring 7 to the top spool end 3A of the spool member 3. Depending on the application, bearings 15 may be provided as shown to reduce the force necessary to rotate the ring 7 with respect to the spool 3. An alternate rotatable attachment is described below, and further such rotatable attachments will be apparent to those skilled in the art.

A top drive 17 is operative to selectively operative to rotate the bottom ring 7 of the upper envelope member 5 with respect to the top spool end 3A. in the illustrated module 1 the top drive 17 is provided by a gear 19 mounted on a shaft 21 rotatably mounted to the spool 3. The shaft is driven by a motor 23, such as an electric motor or hydraulic motor. The gear 15 engages corresponding ring gear teeth 25 on the bottom ring 7. FIG. 3 also schematically illustrates a similar bottom drive 27 operative to rotate the top ring 9 of an adjacent lower envelope member connected as described below.

Figure 6:
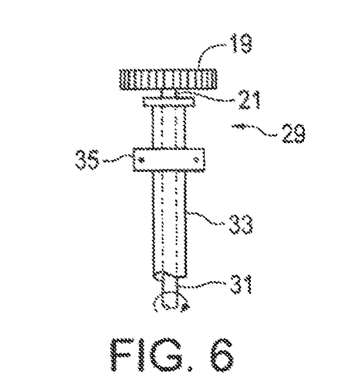
FIG. 6 is a schematic side view of a rotating cable drive.

While the shaft 21 is typically driven by a motor, it is contemplated as well that a flexible cable drive 29, as schematically illustrated in FIG. 6, could also be used to rotate the shaft 21 and gear 19. The flexible cable drive 29 includes a rotating cable 31 enclosed in an outer sheath 33 that is secured to the spool member 3 by a clamp 35 or the like to prevent rotation and movement of the sheath 33. A further alternative drive is described below.

While the illustrated module 1 shows the engagement of the shaft 21 and bottom ring 7 by meshing gears 15 and 21, it is also contemplated that a smooth resilient rotating member mounted on the shaft 21 could bear against a smooth surface of the bottom ring 7 and rotate the ring 7 by friction as is known in the art when rotational forces are not excessive. Other modes of drive could be utilized to cause relative motion between a spool and an envelope to deliver articulation.

Figure 7:
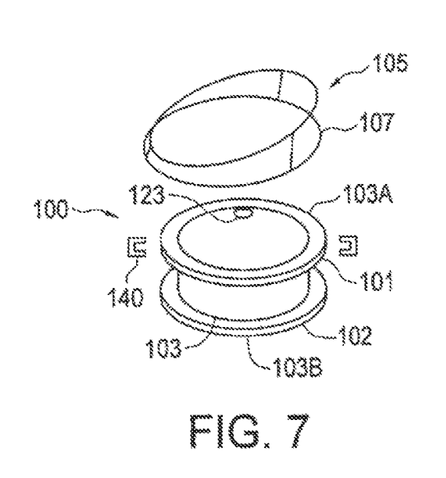
FIG. 7 is a schematic exploded view of the spool member and envelope member of an alternate embodiment of a manipulator arm module of the present invention.
Figure 8:
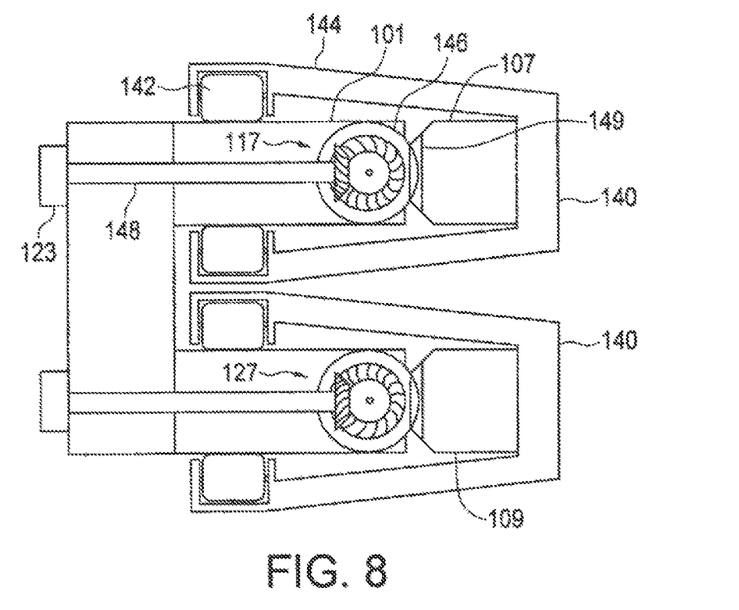
FIG. 8 is a schematic cut-away side view of the rotatable connection of the bottom ring to the spool member, and the connection of the top ring of an adjacent module to the spool member, and of the drives for the top and bottom rings, of the embodiment of FIG. 7.
Figure 9:
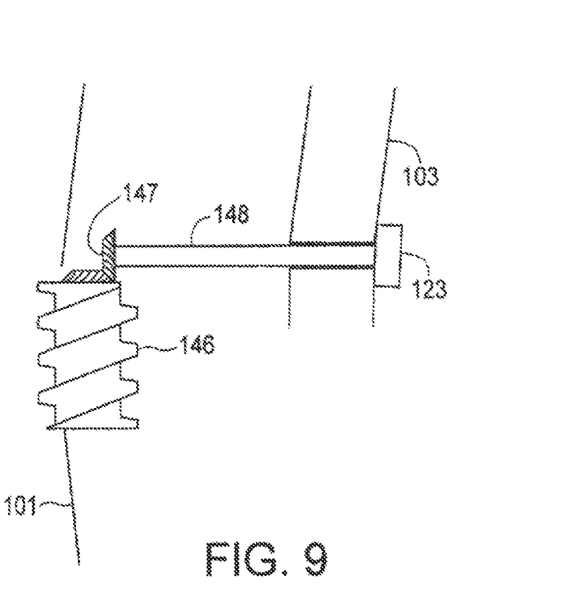
FIG. 9 is a schematic cut-away top view of the drives of FIG. 8.

FIGS. 7-9 schematically illustrate an alternate arm module 100 where the spool member 103 is a hollow cylinder having an outwardly projecting upper flange 101 flush with the top spool end 103A and an outwardly projecting lower flange 102 flush with the bottom spool end 103B. The bottom ring 107 of the upper envelope member 105 has an inside diameter just slightly greater than the outside diameter of the upper flange 101 such that the ring 107 fits around the upper flange 101 as schematically illustrated in FIG. 8.

The envelope member 105 is rotatably connected to the spool 103 by a plurality of clips 140. The illustrated clips 140 are a square C-shape with a roller 142 on each arm 144. The clips 140 thus keep the ring 107 in position with respect to the upper flange 101. The clips 140 are typically fastened to the ring 107 and move with the ring 107 on the rollers 142. Thus the ring 107 can rotate with respect to the upper flange 101 of the spool member 103 but is prevented from moving away from the flange 101. For heavy duty usage, the clips 140 could be made longer, or even joined together to totally enclose the ring 107.

In the module 100, the top drive 117 is provided by one or more worm gears 146 rotatably fixed to the upper flange 101 of spool 103 and driven by bevel gears 147 and a shaft 148 extending through the upper flange 101 to a motor 123 mounted on the inner wall of the spool 103. The worm gear 146 engages with ring gear teeth 149 on the inner surface of the bottom ring 107 so that as the worm gear 146 is rotated, the ring 107 is rotated relative to the spool 103. A similar bottom drive 127 is shown as well to drive the top ring 109 of an adjacent module.

It is also contemplated that a person skilled in the art will recognize other suitable drive mechanisms.

Modules 1 of the present invention can be connected to form a manipulator arm, or used individually. For example it is contemplated that a single module 1 could be attached to the end of an excavator arm. The spool 3 could be attached to the end of the excavator arm, and the bucket attached to the top ring of the upper envelope member. Rotating the envelope member with respect to the spool then will rotate the bucket and allow same dig at a different angle relative to the excavator arm. This application requires structural integrity modifications that account for significant lateral forces.

Figure 10:
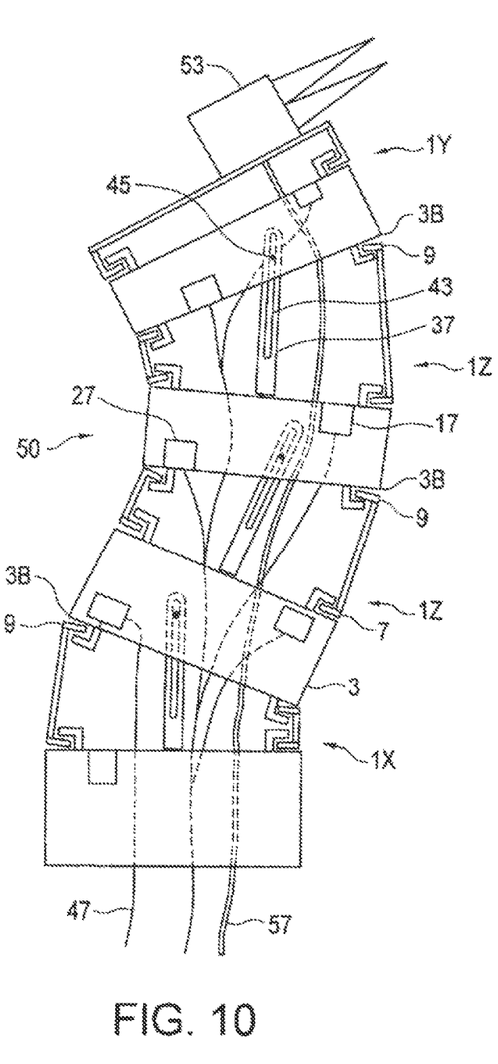
FIG. 10 is a schematic side view of a manipulator arm apparatus comprising a connected plurality of the modules of FIG. 1.

A manipulator arm apparatus 50 is schematically illustrated in FIG. 10, where a plurality of modules 1 arc stacked and connected together. The upper envelope member 5 of a next lower module 1 becomes a lower envelope member of the next higher adjacent module. As schematically illustrated in FIG. 3, the top ring 9 of the lower envelope member 5 is rotatably attached to the bottom spool end 3B of the spool member 3 and a bottom drive 27 is operative to selectively rotate the top ring 9 of the lower envelope member 5 with respect to the bottom spool end 3B. The top and bottom drives 17 and 27 are operated independently and the spool members 3 are connected together by stabilizers as described below which allow the hollow spool members 3 to move closer together or farther apart, but resist relative rotative movement of the spool members 3, such that as the rings 7 and 9 rotate, the orientation of the apparatus changes. In use the bottom end of the lowest spool member 3 would typically be anchored to a base, such that the tool 53 is manipulated with respect to a fixed point provided by the anchored base.

The manipulator arm apparatus 50 thus comprises a plurality of manipulator arm modules 1, including a first end manipulator arm module IX, an opposite second end manipulator arm module 1Y, and a plurality of intermediate manipulator arm modules 1Z. The bottom spool end 3B of each intermediate module 1Z is rotatably attached to the top ring 9 of a next lower adjacent module, and a top ring 9 of each intermediate module is rotatably attached to the bottom spool end 3B of a next higher adjacent module.

Top and bottom drives 17, 27 are operative to selectively rotate the top and bottom rings 9, 7 of each envelope member 5 with respect to the spool member 3 to which same is rotatably attached. Stabilizers 37 are connected between the adjacent hollow spool members 3 and are operative to allow the adjacent hollow spool members 3 to move closer together or farther apart, and yet resist relative rotative movement of the adjacent hollow spool members 3.

Figure 11:
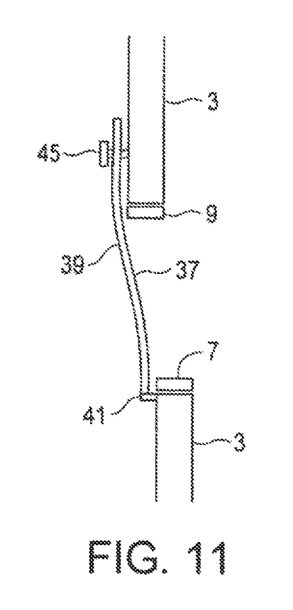
FIG. 11 is a schematic side view of the stabilizer of the manipulator arm apparatus of FIG. 10.

A stabilizer 37 is schematically illustrated in FIGS. 10 and 11 for example as a slide type stabilizer, comprising an elongated plate 39 pivotally attached to one hollow spool member 3 by a hinge 41 providing a single pivot axis oriented generally perpendicular to the radius of the bottom ring 7 such that the plate 39 cannot pivot in the rotation direction of the ring 7. The plate 39 defines a slot 43 engaging a stabilizer pin 45 in the adjacent hollow spool member configured such that as the rings 9, 7 rotate and the spool members 3 move toward and away from each other, the pin 45 slides in the slot 43. It is contemplated that other mechanisms could also provide the required stabilization preventing rotation and allowing the hollow spool members 3 to move closer together or farther apart while resisting rotation of the spool members with respect to each other.

Control connectors 47 extend through the hollow spool members 3 and top and bottom rings 9, 7 of the plurality of manipulator arm modules 1. The control connectors 47 commonly include hydraulic conduits, electric wires, flexible rotating cables, and the like to power the top and bottom drives 17, 27 and also can include power and control connectors 51 for a tool 53 mounted on the end of the manipulator arm apparatus 50.

Figure 12:
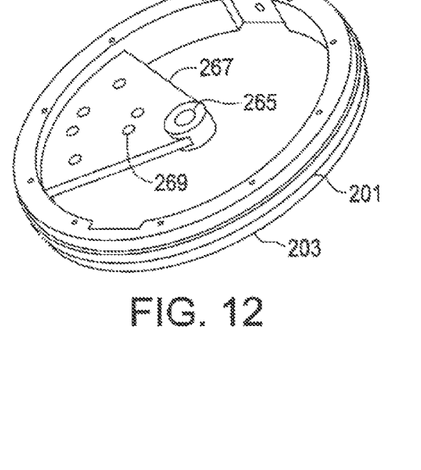
FIG. 12 is a perspective view of a spool member of an alternate embodiment of a manipulator arm module of the present invention.
Figure 13:
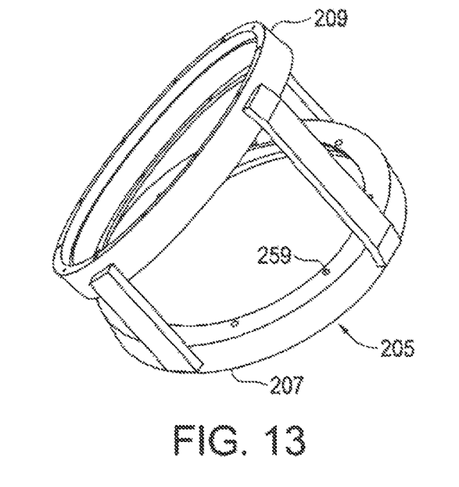
FIG. 13 is a perspective view of the envelope member of the alternate embodiment.
Figure 14:
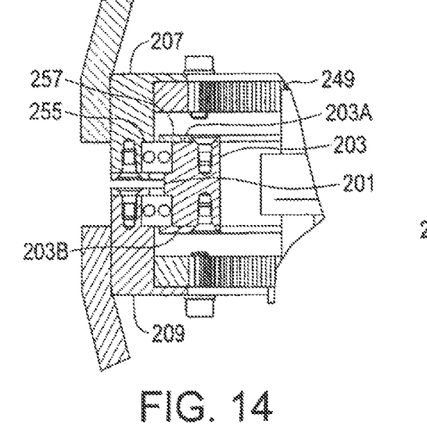
FIG. 14 is a schematic cut-away side view of the connection of the spool member of FIG. 12 to upper and lower envelope members of FIG. 13 to form an alternate manipulator arm apparatus.
Figure 15:
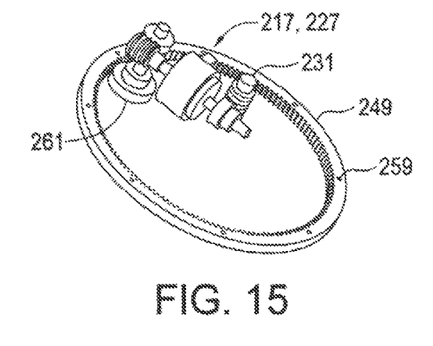
FIG. 15 is a perspective view of the drive of the alternate manipulator arm apparatus.

FIGS. 12-14 schematically illustrate the components of an alternate arm module where the spool member 203 is a very short hollow cylinder having a outwardly projecting central flange 201 between the top spool end 203A and the bottom spool end 203B. The bottom ring 207 of the upper envelope member 205 has an inside diameter just slightly-greater than the outside diameter of the spool member 203 such that the ring 207 fits around the spool member 203 as schematically illustrated in FIG. 14, and rotates with respect to the spool member 203 on a bearing 255 secured between a bearing plate 257 and the central flange 201.

In the illustrated module, a ring gear 249 is secured in the bottom ring 207 by screws or bolts through holes 259 and the top drive 217 is provided by a gear 261 that engages the ring gear 249. The gear 261 is selectively rotated by engagement of a clutch/brake mechanism 263 that is connected to a rotating shaft 21. The clutch 263 is activated remotely to engage or disengage the gear 261 with the rotating shaft 231 to rotate the bottom ring 207 and thus the upper envelope member 205 with respect to the spool member 203. When disengaged the mechanism 263 acts as a brake to prevent relative rotation of the envelope member 205 and spool member 203. As shown in FIG. 7 the rotating shaft comprises a plurality of shaft sections 231A connected by universal joints 231B.

The shaft sections 231A pass through the hole 265 at the center of the spool member 203 that is defined in a pie section 267 of the spool member 203 that extends inward from the outer portion of the spool member 203. In addition to securing the rotating shaft 231 in the center of the spool member 203, the pie section also defines service holes 269 through which various hydraulic conduits, electric wires, flexible rotating cables, and the like can pass to be secured if desired in the interior of the module, while the majority of the interior of the spool member is left unobstructed. A similar bottom drive 227 is shown as well to drive the top ring 209 of an adjacent module.

Figure 16:
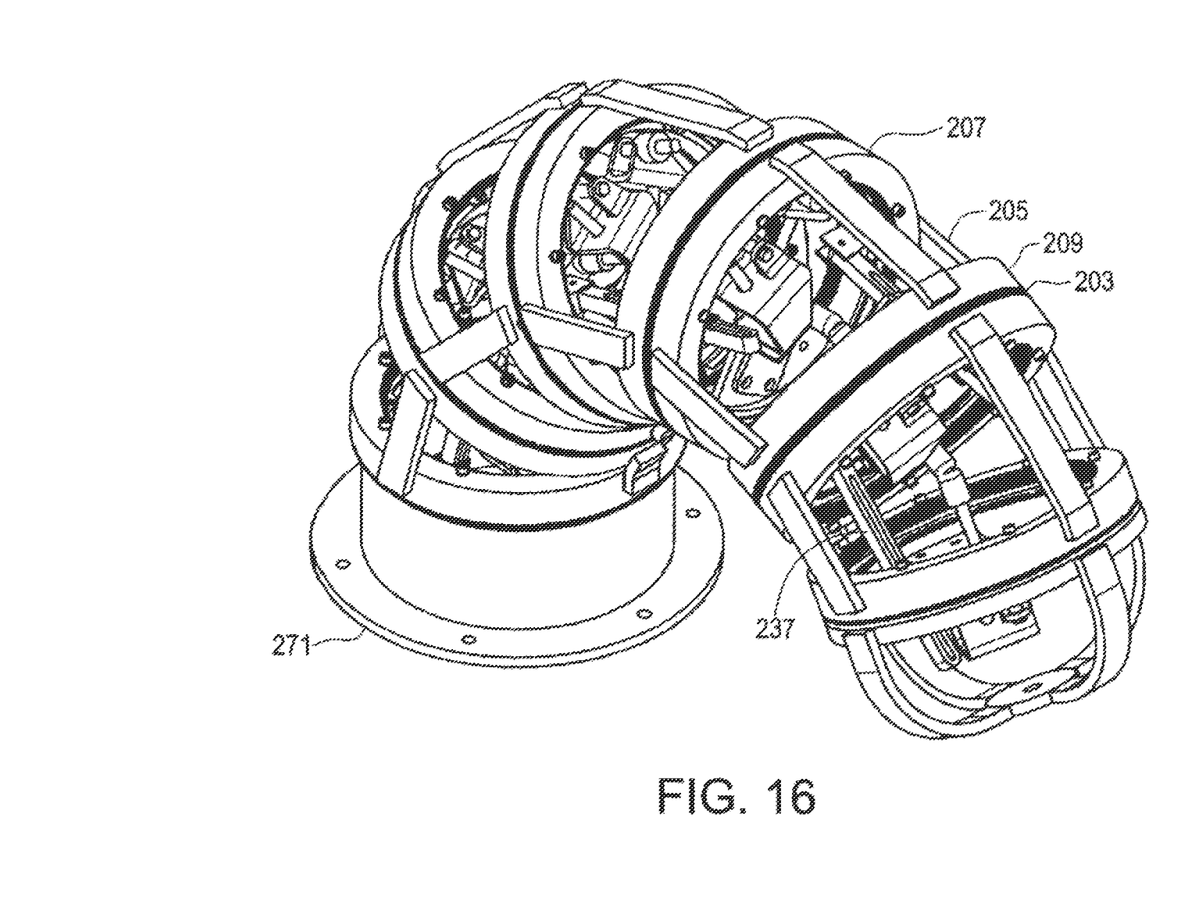
FIG. 16 is a perspective view of the alternate manipulator arm apparatus.
Figure 17:
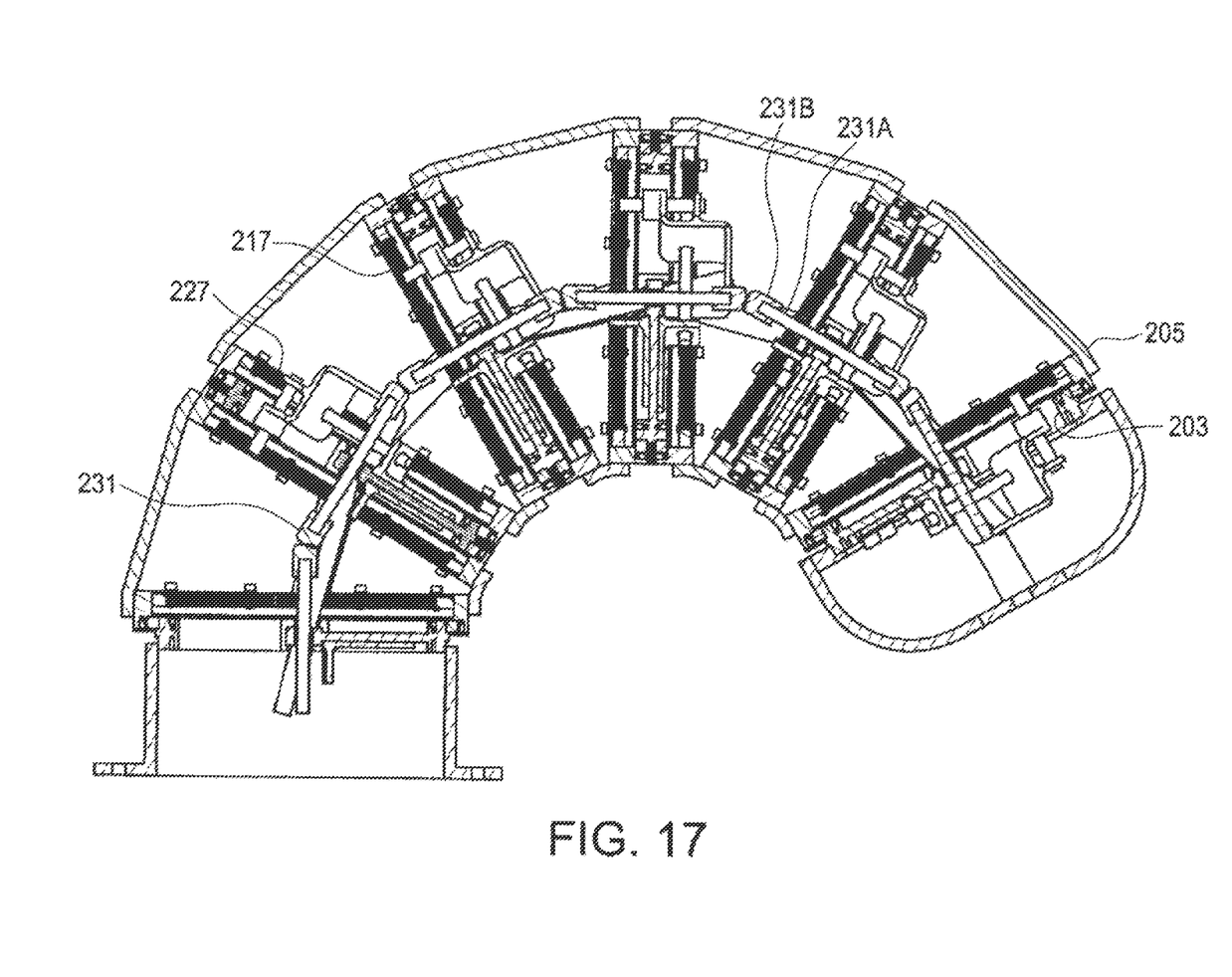
FIG. 17 is a schematic cut-away side view of the alternate manipulator arm apparatus.

The illustrated modules can be connected to form a manipulator arm 250 as schematically illustrated in FIGS. 16 and 17, or used individually. The upper envelope member 205 of a next lower module becomes a lower envelope member of the next higher adjacent module. As schematically illustrated in FIG. 14, the top ring 209 of the lower envelope member 205 is rotatably attached to the bottom spool end 203B of the spool member 203 and a bottom drive 227 is operative to selectively rotate the top ring 209 of the lower envelope member 205 with respect to the bottom spool end 203B. The top and bottom drives 217 and 227 are operated independently and the spool members 203 are connected together by stabilizers 237 which allow the hollow spool members 203 to move closer together or farther apart, but resist relative rotative movement of the spool members 203 with respect to each other, such that as the rings 207 and 209 rotate, the orientation of the apparatus changes. The bottom end of the lowest spool member 203 is anchored to a base 271, such that a tool fixed to the upper end of the arm 250 is manipulated with respect to a fixed point provided by the anchored base 271. Various tools, such as lasers, cameras, and robotic hands, among other tools can be mounted to one end of the manipulator arm apparatus 50 depending on the needs of a particular application. Operating each top and bottom drive 17, 27 independently allows for a wide range of movement for the tool. It is also contemplated that the module and arm apparatus of the present invention can be scaled for use on large machines, and down to a small size such as would be suitable for example for medical uses.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:
1. A manipulator arm module comprising:
 a hollow spool member having top and bottom spool ends oriented in corresponding top and bottom spool end planes;
 an upper envelope member comprising a bottom ring rotatably attached to the top spool end, a top ring oriented at an angle to the bottom ring, and a plurality of struts connecting the top and bottom rings in a substantially rigid relationship; and
 a top drive operative to selectively rotate the bottom ring of the upper envelope member with respect to the top spool end;
 wherein lengths of the struts of the upper envelope member are adjustable such that the angle between the top and bottom rings of the upper envelope member can be adjusted.
2. The module of claim 1 further comprising:
 a lower envelope member comprising a top ring rotatably attached to the bottom spool end, a bottom ring oriented at an angle to the top ring, and a plurality of struts connecting the top and bottom rings of the lower envelope member in a substantially rigid relationship; and a bottom drive operative to selectively rotate the top ring of the lower envelope member with respect to the bottom spool end.

3. The module of claim 2 wherein the hollow spool member is a first hollow spool member and further comprising:

a second hollow spool member having top and bottom spool ends oriented in substantially parallel spool end planes, wherein the top spool end of the second hollow spool member is rotatably attached to the bottom ring of the lower envelope member; and a second top drive operative to selectively rotate the bottom ring of the lower envelope member with respect to the top spool end of the second spool member; and at least one stabilizer connected between the first and second hollow spool members and operative to allow the first and second hollow spool members to move closer together or farther apart, and resist relative rotative movement of the first and second hollow spool members.

4. The module of claim 3 wherein the stabilizer comprises a plate pivotally attached to the first hollow spool member and defining a slot engaging a stabilizer pin in the second hollow spool member.

5. The module of claim 1 wherein the top drive comprises a shaft rotatably mounted to the hollow spool member and driven by at least one of an electric motor, a hydraulic motor, and a flexible rotating cable, and wherein the shaft engages the bottom ring to rotate the bottom ring with respect to the top spool end.

6. The module of claim 5 comprising a gear mounted on the shaft and engaging corresponding gear teeth on the bottom ring.

7. A manipulator arm apparatus comprising a plurality of manipulator arm modules according to claim 1, including a first end manipulator arm module, an opposite second end manipulator arm module, and a plurality of intermediate manipulator arm modules wherein:

a bottom spool end of each intermediate module is rotatably attached to the top ring of a next lower adjacent module, and a top ring of each intermediate module is rotatably attached to the bottom spool end of a next higher adjacent module;

a bottom drive is operative to selectively rotate the top ring of each intermediate module with respect to the bottom spool end of the next adjacent module; and at least one stabilizer connected between adjacent hollow spool members and operative to allow the adjacent hollow spool members to move closer together or farther apart, and operative to resist relative rotative movement of the adjacent hollow spool members.

8. The apparatus of claim 7 comprising control connectors extending through the hollow spool members and top and bottom rings of the plurality of manipulator arm modules.

9. The apparatus of claim 8 wherein the control connectors include at least one of hydraulic conduits, electric wires, and flexible rotating cables.

10. The apparatus of claim 7 wherein the at least one stabilizer comprises a plate pivotally attached to the one hollow spool member and defining a slot engaging a stabilizer pin in the adjacent hollow spool member.

* * * * *